United States Patent [19]

Kubo et al.

[11] Patent Number: 4,480,499

[45] Date of Patent: Nov. 6, 1984

[54] DRIVING DEVICE FOR AUTOMOBILES

[75] Inventors: Seitoku Kubo; Koujiro Kuramochi; Tatsuo Kyushima, all of Toyota, Japan

[73] Assignee: Toyota Jidosha Kogyo Kabushiki Kaisha, Japan

[21] Appl. No.: 262,786

[22] Filed: May 11, 1981

Related U.S. Application Data

[63] Continuation of Ser. No. 31,778, Apr. 20, 1979, abandoned.

[30] Foreign Application Priority Data

Apr. 24, 1978 [JP] Japan .................................. 53-49063

[51] Int. Cl.³ ............................................ F16H 37/08
[52] U.S. Cl. ........................................ 74/695; 74/740
[58] Field of Search ................ 180/70 R, 70 MS, 297; 74/740, 695

[56] References Cited

U.S. PATENT DOCUMENTS

| 2,093,236 | 9/1937 | Dodge | 74/740 |
|---|---|---|---|
| 3,035,455 | 5/1962 | Peras | 74/645 |
| 3,095,764 | 7/1963 | Peras | 74/763 |
| 3,302,740 | 2/1967 | Giacosa | 180/297 |
| 3,339,431 | 9/1967 | Crosswhite et al. | 74/688 |
| 3,411,382 | 11/1968 | Mori | 74/688 |
| 3,482,469 | 12/1969 | Mori | 74/763 |
| 3,561,291 | 2/1971 | Webster et al. | 74/740 |
| 3,572,169 | 3/1971 | Fisher | 74/763 |
| 3,602,055 | 8/1971 | Hause | 74/759 |
| 3,614,902 | 10/1971 | Candellero | 74/695 |
| 3,800,626 | 4/1974 | Koivunen | 74/695 |
| 3,802,294 | 4/1974 | Smirl | 74/759 |
| 3,812,739 | 5/1974 | Mori et al. | 74/763 |
| 3,926,073 | 12/1975 | Roche et al. | 74/753 |
| 3,958,655 | 5/1976 | Kronogard | 180/297 |
| 3,979,973 | 9/1976 | Klaue | 74/740 |
| 4,043,223 | 8/1977 | Ohnuma | 74/688 |
| 4,056,988 | 11/1977 | Kubo et al. | 74/740 |
| 4,095,487 | 6/1978 | Cartwright | 74/695 |
| 4,157,046 | 6/1979 | O'Malley | 74/763 |

FOREIGN PATENT DOCUMENTS

| 1177949 | 9/1964 | Fed. Rep. of Germany | 74/695 |
|---|---|---|---|
| 2722891 | 12/1977 | Fed. Rep. of Germany | |
| 2286987 | 4/1976 | France | |

Primary Examiner—Allan D. Herrmann
Assistant Examiner—D. Wright
Attorney, Agent, or Firm—Finnegan, Henderson, Farabow, Garrett & Dunner

[57] ABSTRACT

An improved transverse-mount type driving device for an automobile, having an output gear provided between last and intermediate planetary gear units of an auxiliary speed change gear assembly, the output gear meshing with a driven gear on a transmission shaft which extends parallel with the auxiliary speed change gear assembly and mounts a drive gear at an end proximate the torque converter for meshing engagement with a differential drive gear which in turn transmits power to right and left axle shafts.

28 Claims, 4 Drawing Figures

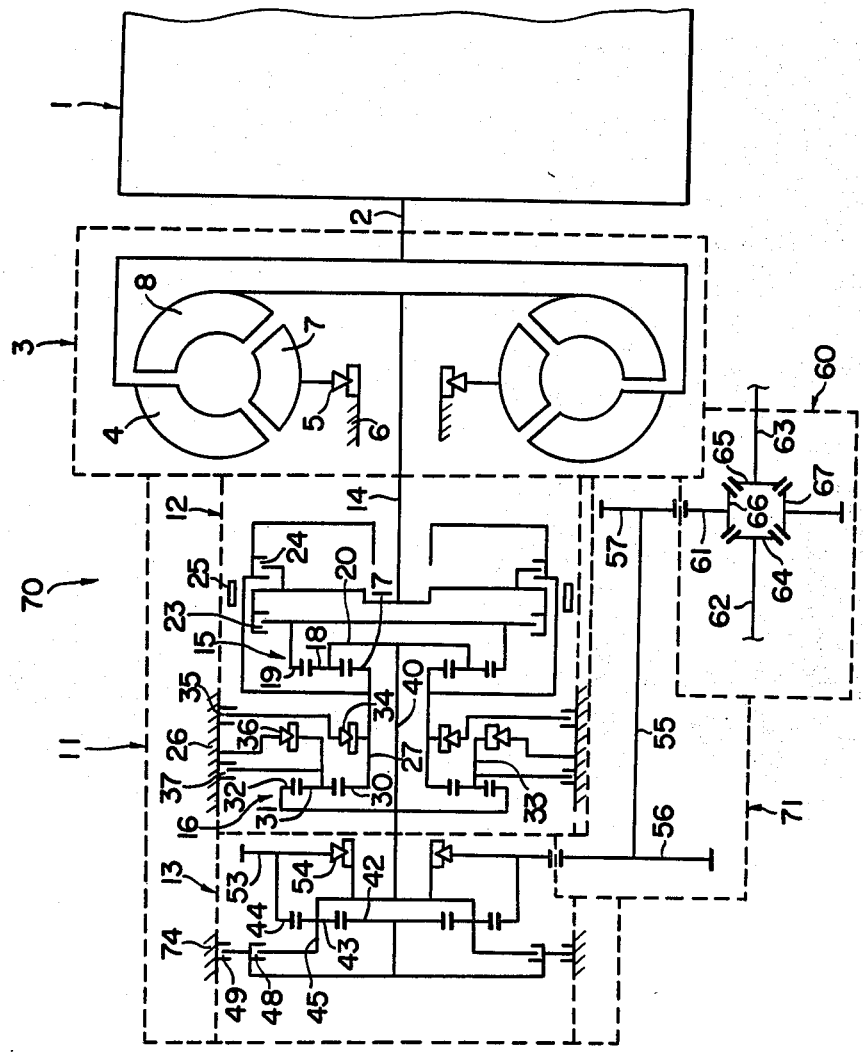

DRIVING DEVICE FOR AUTOMOBILES

This is a continuation of application Ser. No. 031,778, filed Apr. 20, 1979, now abandoned.

BACKGROUND OF THE INVENTION

1. Field of the Invention

This invention relates to a driving device for an automobile, and more particularly to a driving device available for a front-wheel driving type or a rear-wheel driving type automobile having a transversely mounted engine, which comprises a combination of automatic speed change gear assembly and final reduction gear.

2. Description of the Prior Art

With a view to affording an increased space to automobiles, front-wheel driving type automobiles are becoming increasingly popular. Such automobiles have advantages of a compact driving device, reduction in weight of the vehicle itself, and reduction in fuel consumption.

It an automatic speed change gear assembly providing the four forward speed range drive and one reverse drive is incorporated in the driving device for a front-wheel driving type automobile having a transversely mounted engine, in order to reduce fuel consumption to greater extent as well as to reduce noise, then it follows that the over-all length of the driving device increases, thus causing interference with the suspension device of the automobile. This imposes an adverse influence particularly on so-called compact cars.

SUMMARY OF THE INVENTION

It is accordingly an object of the present invention to provide a driving device for use in automobiles, wherein at least an automatic speed change gear for providing the four-forward speed range drive and one reverse drive is incorporated, and the length of the driving device is reduced, thereby eliminating interference with the automobile's suspension unit.

In order to accomplish this object, the present invention proposes a driving device for automobiles comprising: a fluid type torque converter and an auxiliary speed change gear assembly having at least three planetary gear units connected organically with each other to establish four different speed ratios and mounted coaxially with the torque converter to transmit power from the torque converter, the first planetary gear unit being proximate the torque converter, the second being intermediate and the third being last or remote from the torque converter. A transmission shaft is mounted parallel with the axis of the auxiliary speed change gear assembly, and an output gear is splined to the output member of a last planetary gear unit of said auxiliary speed change gear assembly at a position between said last planetary gear unit and the intermediate planetary gear unit. A driven gear is mounted on one end of the transmission shaft and meshed with the output gear, and a differential gear for transmitting to right and left axle shafts the power received from a drive gear mounted on the other end of the transmission shaft is disposed proximate to the torque converter.

According to another aspect of the present invention, a driving device for an automobile comprises: a fluid type torque converter and an auxiliary speed change gear assembly having at least three planetary gear units organically connected with each other to establish four forward and one reverse speed ratios and mounted coaxially with the torque converter to transmit power from the torque converter the first planetary gear unit being proximate the torque converter, the second being intermediate and the third being last or remote from the torque converter. A transmission shaft is provided substantially parallel with the axis of the auxiliary speed change gear assembly and an output gear is connected to an output member of a last planetary gear unit. A driven gear is mounted at one end of the transmission shaft and meshed with the output gear and a final reduction gear for transmitting to right and left axle shafts the power transmitted from a drive gear is mounted at the other end of the transmission shaft proximate the torque converter. A drive case substantially housing the fluid type torque converter, two of the planetary gear units, the transmission shaft and the final reduction gear is provided. A cylindrical case is provided at the rear end of said drive case between the last and intermediate planetary gear units and an auxiliary case is connected to the rear end of the drive case to house therein the last planetary gear unit and to support one end of the transmission shaft through a bearing.

According to still another aspect of the present invention, there is proposed an engine-powered motor vehicle including an engine mounted laterally at one end of the vehicle body, a pair of wheels provided at opposite sides at the one end of the vehicle body, and an automatic power transmission connecting the engine with the wheels. The automatic power transmission comprises a housing attached at one end thereof to the engine; a torque converter driven by the engine and accommodated within the housing in a position adjoining the engine; an auxiliary speed change gear assembly driven by the torque converter and having a plural number of rotatable members about a common axis of rotation to establish at least four different speed ratios across the input and output ends thereof; a transmission shaft extending parallel with the axis of rotation of the rotatable members and located adjacent to the rotatable members; a transmission gear connecting the auxiliary speed change gear assembly with the transmission shaft at the other end of the housing remote from the engine; a differential drive gear provided on said transmission shaft at a position adjacent to the one end of the housing adjoining the engine; differential gears driven by the differential drive gear to drive said wheels; a steering knuckle rotatably supporting the wheels; a lower arm connecting said knuckle joint to the vehicle body; and a stabilizer connected at one end to the lower arm and at the other end to the vehicle body to increase the rolling stiffness thereof, said stabilizer being extended beneath the rear end of the housing.

According to still another aspect of the present invention, there is proposed a transmission comprising a planetary gear unit including an input shaft, a sun gear, a carrier supporting a number of pinion gears for meshing engagement with the sun gear and a ring gear meshing with the pinion gears; an output gear meshing with spline teeth on the ring gear of the planetary gear unit; a bearing connected to the input shaft and the carrier and interposed between an output gear and input shaft; a clutch for operatively connecting the sun gear with the carrier; and a brake for fixedly and operatively braking the sun gear.

According to still another aspect of the present invention, there is proposed a driving device for an automobile, comprising: a fluid type torque converter having input and output shafts; an auxiliary speed change gear assembly including an underdrive incorporating first and second planetary gear units to produce at least three different speed ratios, an intermediate shaft connected to an output member of the underdrive and disposed coaxially with the input shaft, an overdrive having an input member connectible with the intermediate shaft and incorporating a third planetary gear unit to produce at least two different gear ratios, and an output gear splined to an output member of the overdrive; a transmission shaft disposed substantially parallel with the intermediate shaft of the auxiliary speed change gear assembly; a driven gear provided on the transmission shaft for meshing engagement with the output gear; and a final reduction gear provided on the transmission shaft in a position on the side of the torque converter to transmit to right and left axle shafts the power transmitted from the drive gear.

BRIEF DESCRIPTION OF THE DRAWINGS

FIG. 1 shows the skeleton of a driving device according to the present invention;

DESCRIPTION OF THE PREFERRED EMBODIMENTS

Figure 2A:
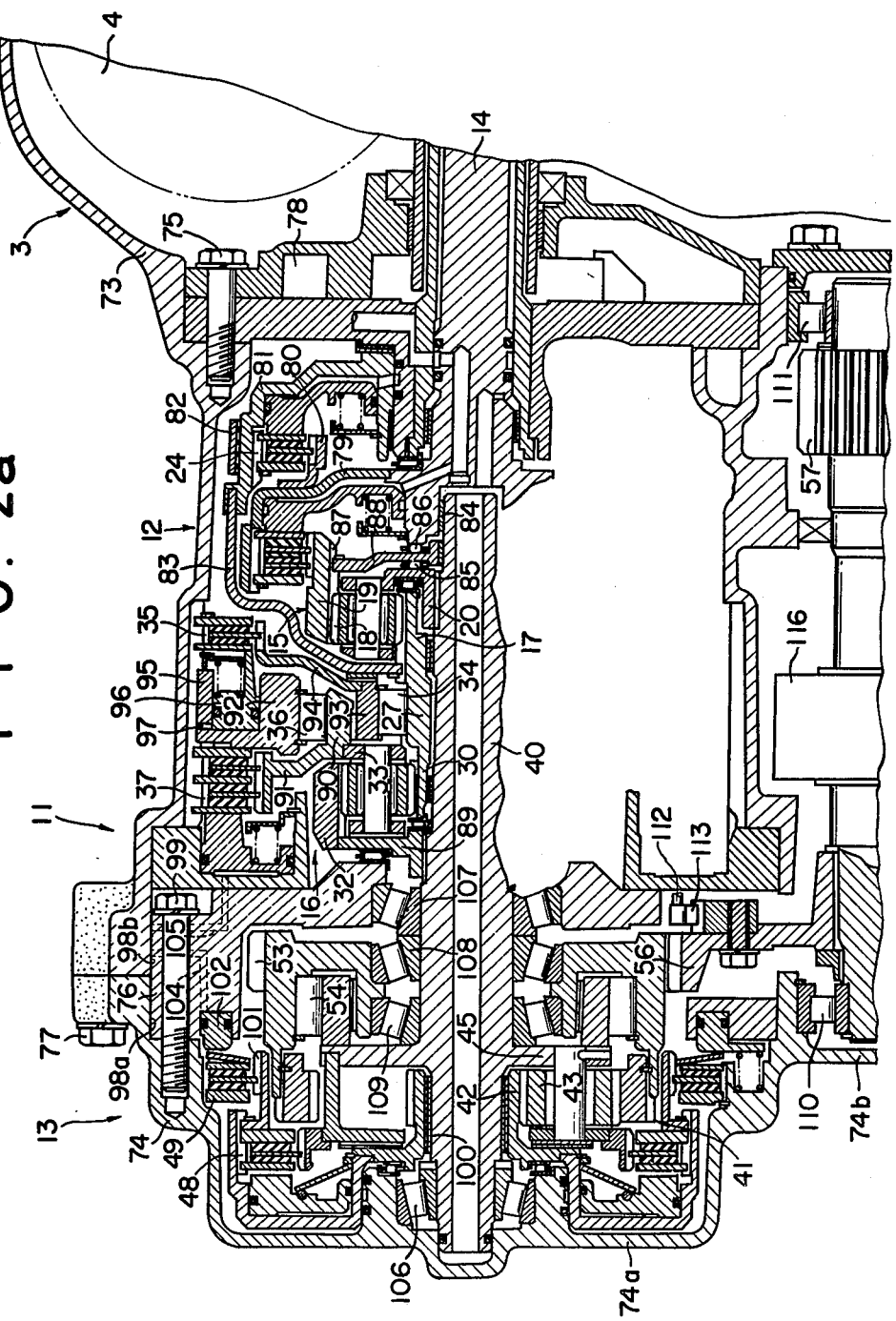
FIGS. 2a and 2b are cross sectional views, partly omitted, of the driving device, respectively; and, FIG. 3 shows the positional relationship of the driving device of the present invention versus the suspension device of an automobile.

In FIG. 1, an engine and a driving device are shown as a skeleton view, wherein an internal combustion engine 1 is transversely placed at right angles with respect to the axis of an automobile between two wheels (rear wheels or front wheels, not shown). The crank shaft 2 of the engine 1 is connected to an automatic speed change gear device 70 of the driving device. This driving device consists of automatic speed change gear device 70 and a final reduction gear 60. Automatic speed change gear device 70 includes a fluid type torque converter 3, an auxiliary speed change gear 11 and a transmission gear 71, and is attached to engine 1 transversely of the automobile. Fluid type torque converter 3 is of a known structure and includes a pump impeller 4 coupled to crank shaft 2, a stator 7 connected by way of a one-way clutch 5 to a stationary portion 6, and a turbine runner 8.

Auxiliary speed change gear assembly 11 includes an underdrive 12 and an overdrive 13 which are mounted coaxially with crank shaft 2. An input shaft 14 of underdrive 12 is coupled to turbine runner 8. Underdrive 12 includes first and second planetary gear units 15 and 16. The first planetary gear unit includes a sun gear 17, planetary pinions 18, a carrier 20 supporting rotatably planetary pinions 18, and a ring gear 19.

A clutch 23 controls the connection between input shaft 14 and ring gear 19, and a clutch 24 controls the connection of input shaft 14 with a sun gear shaft 27 connected to sun gear 17. A brake 25 governs the connection of sun gear 17 with a fixed drive case 73. Second planetary gear unit 16 includes a sun gear 30, planetary pinions 31, a ring gear 32, and a carrier 33 supporting planetary pinions 31 rotatably. Sun gear 30 is connected to sun gear shaft 27, and a one-way clutch 34 and a brake unit 35 are provided in series between sun gear shaft 27 and drive case 73. A one-way clutch 36 and a brake unit 37 are provided in parallel between carrier 33 and drive case 26. One-way clutches 34 and 36 are coaxial with each other as viewed in the radial direction, and placed one upon another as viewed in the axial direction.

An intermediate shaft 40 extending through the center of auxiliary speed change gear assembly 11 is coaxial with input shaft 14 and connected to carrier 20 and ring gear 32, so that power from under-drive 12 is transmitted to over-drive 13. Over-drive 13 includes a planetary gear unit 41. Planetary gear unit 41 includes a sun gear 42, planetary pinions 43, a ring gear 44, and a carrier 45 supporting planetary pinions 43 rotatably. Carrier 45 is coupled to intermediate shaft 40. A clutch unit 48 governs the connection of carrier 45 with sun gear 42, and a brake unit 49 governs the connection of sun gear 42 with auxiliary case 74. Ring gear 44 is equivalent to the output of over-driven unit 13, and an output gear 53 is connected to ring gear 44 integrally therewith. A one-way clutch 54 governs the connection of carrier 45 and ring gear 44 with output gear 53.

Referring to transmission gear 71, a transmission shaft or a counter shaft 55 extends substantially in parallel to intermediate shaft 40, and has at one end a driven gear 56 meshing with output shaft 53 and at the other end thereof a drive gear 57. In order to position final reduction gear 60 substantially centrally of a vehicle in the transverse direction thereof, drive gear 57 is positioned nearer to torque converter 3 than driven gear 56 is. Drive gear 57 is meshed with a gear 61 of final reduction gear 60. Final reduction gear 60 is of a known structure, wherein left and right axles 62 and 63 extend from side gear 64 in parallel to the axis of auxiliary speed change gear assembly 11. Axles 62 and 63 are connected to left and right front wheels (not shown). Shafts which rotatably support pinions 66 and 67 meshing with side gears 64 and 65 rotate along with gear 61.

Operation of auxiliary speed change gear assembly will be more in detail described with reference to the following table.

TABLE

| Speed range | 23 | 24 | 25 | 35 | 37 | 34 | 36 | 48 | 49 | 54 |
|---|---|---|---|---|---|---|---|---|---|---|
| First speed | O | | | | O | | Δ | O | | Δ |
| Second speed | O | | O | O | | Δ | | O | | Δ |
| Third speed | O | O | | | | | | O | | Δ |
| Over-drive | O | O | | | | | | | O | |
| Reverse | | | | O | | O | | O | | Δ |

In this table, numerical figures represent the clutch units, brake units and one-way clutches shown, respectively; a circular mark (O) represents that clutch units and brake units are brought into engagement; and a triangular mark (Δ) represents that one-way clutches are brought into an engagement when an engine is run. Engagement and disengagements of each clutch and brake are governed by supply of an oil pressure from an oil pressure unit to an oil pressure servo mechanism constituting such units and discharge of the oil pressure from the servo mechanism.

Figure 2B:
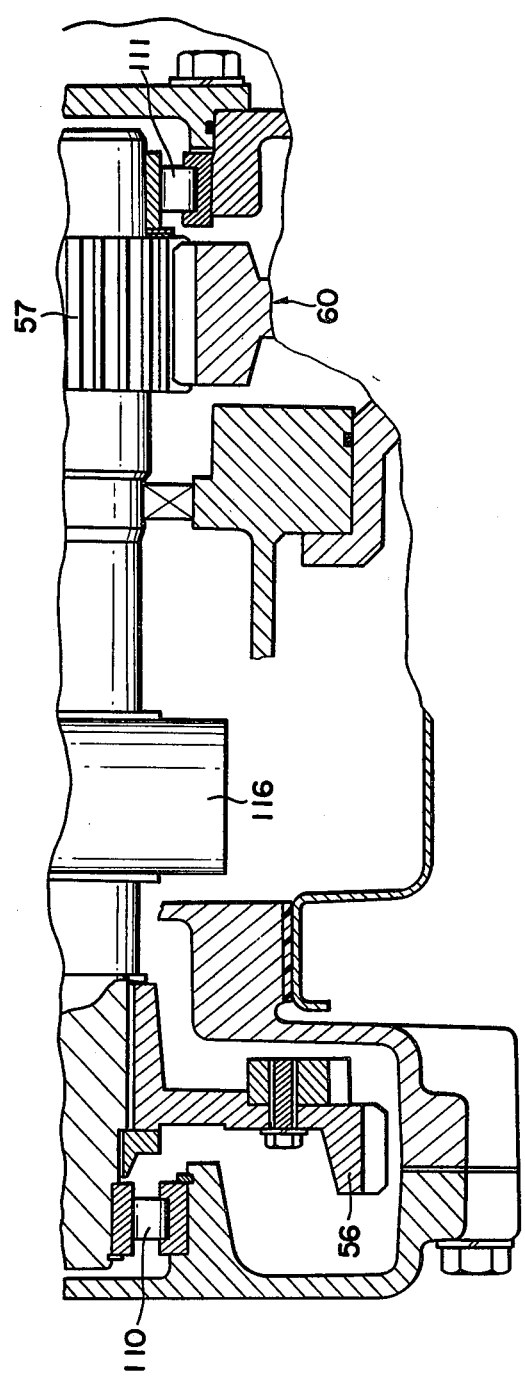

FIGS. 2a and 2b show an example of the automatic speed change gear and transmission gear in the driving device. Respective components will be more in detail described in conjunction with these drawings.

The driving device includes; a drive case 73 housing therein fluid type torque converter 3, underdrive 12 of auxiliary speed change gear assembly 11 coaxial with torque converter 3, transmission gear assembly 71 located under auxiliary speed change gear assembly 11 near to the left side as viewed in FIG. 1, and final reduction gear assembly 60 located under transmission gear assembly 71; and an auxiliary case 74 substantially housing therein overdrive 13 coaxial with underdrive 12. Drive case 73 is bolted at one end to the right side surface of the engine at several points (not shown) and bolted at the other end to auxiliary case 74 at several points as at 77, in a manner to enclose a cylindrical case 76 to be described later.

Underdrive 12 is positioned in drive case 73 on the engine side thereof, and an oil pump 78 is bolted as at 75 to drive case 73, which in turn is mounted on the input shaft, the aforesaid oil pump serving as an oil pressure source for supplying an oil pressure and a working oil by way of an oil pressure control unit (not shown) to the respective clutches, brake units and the fluid torque converter.

In underdrive 12 on the engine side thereof, there are provided clutch units 23 and 24 which are connected to each other through the medium of a drum 70 and a hub 80 which are welded to input shaft 14 of auxiliary speed change gear 11, and a brake band 82 of brake unit 25 wound to the outer periphery of a drum 81 of clutch unit 24, in order to arrest a sun gear shaft 27 at a locked position. Provided in the unit 12 on the other side thereof are two planetary gear units 15 and 16 connected to a hollow sun gear shaft 27 coaxial with input shaft 14 and having teeth at each end thereof.

Sun gear shaft 27 is spline-fitted, through the medium of a drive 83 involving therein clutch unit 23 and planetary gear unit 15, on the outer periphery of drum 81 of clutch unit 24. The teeth at the opposite ends of sun gear shaft 27 serve as sun gears 17 and 30 for planetary gear units 15 and 16. The planetary gear unit 15 is thus composed of; pinion 18 meshing with sun gear 17 and rotatably supported by carrier 20; and ring gear 19 meshing with pinion 18.

Ring gear 19 is connected to clutch unit 23, and intermediate shaft 40 is supported at one end by input shaft 14 through the medium of a bush 84, extends through sun gear shaft 27, and carried at the other end by a cylindrical case 76 and auxiliary case 74 through the medium of bearings. Carrier 20 is spline-fitted on intermediate shaft 40.

A disc 88 is disposed between carrier 20 and the one end of input shaft 14 and spline-fitted on intermediate shaft 40 for being supported thereby. Ring gear 19 has an outer peripheral surface spline-fitted in clutch unit 23 and an inner peripheral surface spline-fitted in disc 88, so that disc 88 may receive a thrust.

Sun gear 17 is spline-fitted in drive 83.

A ring gear 32 of planetary gear unit 16 is spline-fitted on intermediate shaft 40 through the medium of a hub 89. Carrier 33 is connected through the medium of a hub 91 to a brake unit 37 positioned above the outer periphery of planetary gear unit 16, so as to be locked at the first speed driving engine coast, the aforesaid hub being formed integrally with an inner race 90 of a one-way clutch 36 brought into engagement at the first speed drive. One-way clutch 36 is provided between two planetary gear units 15 and 16, as viewed in the axial direction. One-way clutch 34 adapted to be brought into engagement with sun gear shaft 27 at the second speed drive is disposed between the radially inner surface of an inner race 90 of one-way clutch 36 and sun gear shaft 27. An outer race 92 of one-way clutch 36 is spline-fitted in drive case 73 on the right side of brake unit 37, as viewed in FIG. 2a. This outer race is provided with a servo mechanism 95 for brake unit 35, in order to fix outer race 93 of one-way clutch 34 through the medium of a hub 94 to drive case 73.

It should be noted that these one-way clutches 34 (for use in the second speed drive) and 36 (for use in the first speed drive) are placed radially in superposed relation to each other in a space defined by two planetary gear units 15 and 16, and the servo mechanism of brake unit 35 for one-way clutch 34 is provided on the outer race 92 of one-way clutch 36. Such placement thus results in the compactness in size of the device itself, particularly reduction in the length of auxiliary speed change gear 11.

Auxiliary case 74 housing therein overdrive unit 13 is bolted at several points as at 77 to one end of drive case 73. An inverted U-shaped cylindrical case 76 is fitted in the diametrically equal inner cylindrical portions defined by the inner walls 98a and 99b of auxiliary case 74 and drive case 73 in the joint portion therebetween. Cylindrical case 76 is bolted at two or more points as at 99 to auxiliary case 74.

In assembling, overdrive 13 and intermediate shaft 40 are placed at first in auxiliary case 74, and cylindrical case 76 is fitted in auxiliary case 74, then fitted in cylindrical portion 98b of drive case 73, and bolted thereto as at 77.

Overdrive 13 is incorporated in a space defined by auxiliary case 74 and cylindrical case 76, as has been described earlier. Carrier 45 supporting pinion 43 of planetary gear unit 41 rotatably is formed integrally with intermediate shaft 40, the aforesaid planetary gear being disposed substantially in the central portion of the aforesaid space. Hollow sun gear 42 is connected through the medium of clutch unit 48 provided in one end portion of auxiliary case 74 to carrier 45, the aforesaid sun gear being in mesh with pinion 43, supported through the medium of bush 100 by intermediate shaft 40, and connected through the medium of a cylindrical hub 101 spline-fitted in clutch unit 48 to brake unit 49 which is located between the inner peripheral wall of auxiliary case 74 and planetary gear unit 41, in order to secure sun gear 42 to auxiliary case 74.

Servo mechanism 102 for brake unit 49 is disposed within cylindrical case 76, which has oil passages 104 and 105 for supplying an oil pressure to servo mechanism 102 and another servo mechanism 103 for brake unit 37. Output gear 53 which is an output member of auxiliary speed change gear assembly 11 is spline-fitted on a member provided between planetary gear unit 41 and cylindrical case 76 as well as ring gear 44 of planetary gear unit 41.

Further, a one-way clutch 54 is provided inside the output gear 53 for holding the unit planetary gear system 41 in locked state by connecting the carrier 45 with the ring gear 44 thereof, the outer race of the one-way clutch 54 being used commonly with the output gear 53. Since one-way clutch 54 is placed within the member serving as an output gear, there results a compact overdrive unit 13 as well as reduction in length of the driving device.

To the effect that intermediate shaft 40 is rotatably supported by drive case 73 and auxiliary case 74, a first thrust bearing 106 is placed between one end of intermediate shaft 40 and auxiliary case 74, and a second thrust bearing 107 is placed between intermediate shaft 40 and cylindrical case 76. These thrust bearings are so arranged as to receive a thrust acting on intermediate shaft 40 just in the opposite directions when an automobile is run forward and backward.

A third thrust bearing 108 abutting second thrust bearing 107 is placed between intermediate shaft 40 and output gear 53, and a fourth thrust bearing 109 adjoining third thrust bearing 108 and contacting carrier 45 is placed between intermediate shaft 40 and output gear 53.

Third and fourth bearings 108 and 109 are so arranged as to receive a thrust acting on intermediate shaft 40 in the opposite directions when an automobile is run forward and backward.

The first and fourth thrust bearings 106 and 109 receive a thrust in the rotational direction, while the second and third thrust bearings 107 and 108 receive a rightward thrust as seen in the figure.

Output gear 53 is in mesh with driven gear 56 mounted on one end of a transmission shaft 55 which is rotatably carried at the opposite ends thereof by bearings 110 and 111.

Drive gear 57 mounted on the other end of transmission shaft 55, which is near to the engine, is in mesh with ring gear 57 of final reduction gear 60, so that the drive force from output gear 53 is transmitted to final reduction gear 60.

Driven gear 56 is diametrically larger than driving gear 57 and has a parking gear 114 formed integrally therewith. When an operator shifts a shift lever within a driver's room to the P(parking) range, then a pawl 113 is brought into engagement with parking gear 114 by way of a transmission link member 112, thereby arresting the driven gear at the locked position.

An oil pressure governor unit 116 for detecting a speed of a vehicle is mounted on transmission shaft 55 between drive gear 57 and driven gear 56.

By placing output gear 53 meshing with driven gear 56 of transmission gear assembly 71 in the front portion of overdrive unit 13 stated otherwise, by placing output gear 53 in a portion nearer to the engine, rather than to planetary gear 41, it follows that an axially outer end portion 74b (cap 142) of transmission gear assembly 71 is indented axially inwardly toward the engine side, as viewed from the end portion 74a of auxiliary speed change gear assembly 11 of auxiliary case 74. Viewing from another angle, clutch unit 48 or a brake unit 73 for over-drive unit 13 is housed in the projecting portion 74a of auxiliary case 74 of auxiliary speed change gear 11.

A strut bar (also serving as a stabilizer) of a strut type suspension device is slidably provided sideways of the end portion 74b and below projecting portion 74a auxiliary case 74.

Figure 3:
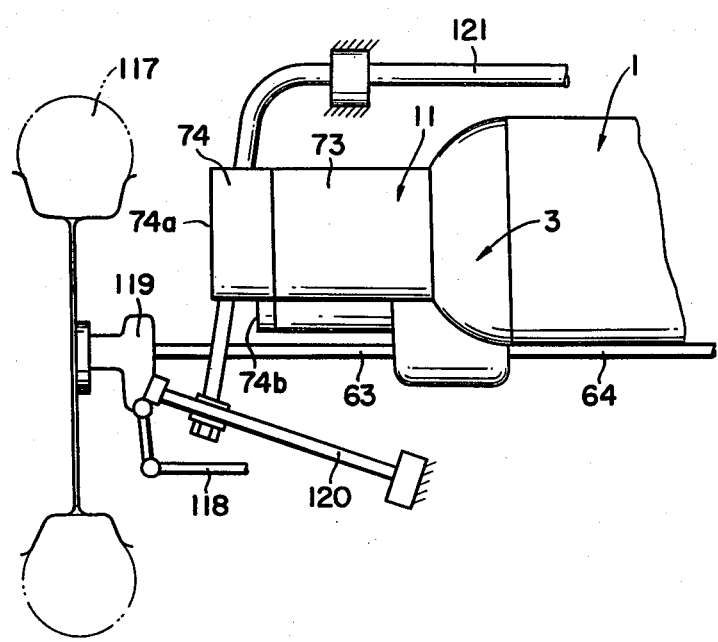

In FIG. 3, the strut bar of the suspension device (serving as a stablizer as well) is slidably disposed.

FIG. 3 schematically shows the positional relationship of the suspension device with the driving device.

In this drawing, wheels 117 are connected by way of a steering knuckle 119 to an axle 63 and a tie rod 118 in a manner to rotate freely and to be freely steered. A lower arm 120 and a strut bar 121 (serving as a stabilizer as well) of the strut type suspension device are connected to steering knuckle 119, so as to fix wheels 117 to the chassis.

Stabilizer 121 is disposed below auxiliary case 74 housing therein overdrive unit of automatic speed change gear 11 and sideways the projecting portion 74a of auxiliary case 74.

As will be understood from the foregoing detailed description of preferred embodiment, the output gear of the last planetary gear system (most distant from the engine) in the gear train of the auxiliary speed change gear assembly is meshed with the driven gear of the transmission gear assembly which is located beneath and along one side of the auxiliary speed change gear assembly to transmit the power to the final reduction gear on the side of the engine, so that it becomes possible to mount the component parts of the suspension in a space which becomes available beneath the auxiliary speed change gear assembly and on one side of the transmission assembly without interference with the drive mechanism.

This effect will become more apparent by reference to U.S. patent application Ser. No. 06/201,154, filed Oct. 27, 1980 by the same applicant, which discloses a drive device with the output gear of the auxiliary speed change gear assembly located at a position most distant from the engine.

In addition to the above-mentioned effect, it becomes possible to shorten the transmission shaft and to reduce the weight of the drive mechanism as a whole.

What is claimed is:

1. A driving device for an automobile having an engine located proximate the driving wheels of said automobile, the axis of the crankshaft of said engine being parallel to the axles of said driving wheels, said driving device comprising:
   a fluid-type torque converter drivingly connected to and coaxial with said engine crankshaft;
   an auxiliary speed change gear assembly comprising at least first, second and third planetary gear units organically interconnected to provide four different speed ratios, said first and third planetary gear units being proximate and distal said torque converter, respectively, and one element of said third planetary gear unit being the output member of said gear assembly, said planetary gear units being driven by and coaxial with said torque converter, the axis of said gear assembly being substantially parallel to the axles of said wheels;
   an output gear drivingly connected to said output member, said output gear being disposed between and coaxial with said second and third planetary gear units and being drivingly connected by an axial spline fitting to said one element of said third planetary gear unit;
   a transmission shaft mounted substantially parallel with the axis of said gear assembly and the axles of said wheels;
   A driven gear secured to one end of said transmission shaft and drivingly meshed with said output gear;
   a drive gear secured to the other end of said transmission shaft for rotation in a plane generally axially between said torque converter and said auxiliary speed change gear assembly; and
   a differential gear disposed substantially centrally between said wheels proximate said torque converter drivingly connected with said drive gear for transmitting power from said gear assembly to the axles of said wheels.

2. A driving device for an automobile having an engine located proximate the driving wheels of said automobile, the axis of the crankshaft of said engine being parallel to the axles of said driving wheels, said driving device comprising:
   a fluid type torque converter drivingly connected to and coaxial with said engine crankshaft;
   an auxiliary speed change gear assembly comprising at least first, second and third planetary gear units organically interconnected to provide four different speed ratios, said first and third planetary gear units being proximate and distal said torque converter, respectively, and one element of said third planetary gear unit being the output member of said gear assembly, said planetary gear units being driven by and coaxial with said torque converter, the axis of said gear assembly being substantially parallel to the axles of said wheels;

an output gear drivingly connected to said output member, said output gear being disposed between and coaxial with said second and third planetary gear units;

a transmission shaft mounted substantially parallel with the axis of said gear assembly and the axles of said wheels;

a driven gear secured to one end of said transmission shaft and drivingly meshed with said output gear;

a drive gear secured to the other end of said transmission shaft proximate said torque converter;

a differential gear disposed substantially centrally between said wheels proximate said torque converter drivingly connected with said drive gear for transmitting power from said gear assembly to the axles of said wheels;

a drive case substantially housing said fluid type torque converter, said first and second planetary gear units, said transmission shaft, and said differential gear, one end of said transmission shaft being supported in said drive case by a bearing;

an auxiliary case substantially housing said third planetary gear unit and supporting the other end of said transmission shaft through a bearing, said auxiliary case being secured to the end of said drive case remote from said torque converter; and a cylindrical case secured within said drive and auxiliary cases and disposed between said second and third planetary gear units.

3. A driving device for an autombile as defined in either of claims 1 or 2, wherein said auxiliary speed change gear assembly comprises underdrive and overdrive gear mechanisms, said overdrive gear mechanism including said third planetary gear unit, each planetary gear unit having a sun gear, planetary pinion gears, a carrier and a ring gear and wherein said one element is the ring gear of said third planetary gear unit.

4. A driving device for an automobile as defined in either of claims 1 or 2, wherein said transmission shaft is mounted on a governor device for regulating the governor pressure in response to said automobile speed.

5. A driving device for an automobile as defined in either of claims 1 or 2, wherein said driven gear has a gear member secured thereto for meshing engagement with a pawl connected to a link member which is actuated when shifted to parking range.

6. A driving device for an automobile as defined in claim 3, wherein said spline fitting comprises axially oriented spline teeth formed on the surface of said ring gear opposite the toothed surface thereof.

7. A driving device for an automobile as defined in claim 6, wherein said output gear is splined with said ring gear and wherein a snap ring is interposed between said output gear and the mating spline teeth of said ring gear.

8. A driving device for an automobile as defined in claim 2, wherein one side portion of said auxiliary case housing said third planetary gear unit is located in a position more distant from the engine than the other side portion supporting one end of said transmission shaft through a bearing.

9. A driving device for an automobile as defined in claim 2, wherein said auxiliary case and said drive case are secured together at a point located on the outer periphery of said cylindrical case.

10. A driving device for an automobile having an engine located proximate the driving wheels of said automobile, the axis of the crankshaft of said engine being substantially parallel to the axles of said driving wheels, the driving device comprising:

a fluid-type torque converter having co-axial input and output shafts, said input shaft being drivingly connected to and coaxial with said crankshaft;

an auxiliary speed change gear assembly drivingly connected to said output shaft and including an underdrive incorporating first and second planetary gear units each including a sun gear, planetary pinions, a carrier and a ring gear organically interconnected to produce at least three different speed ratios, an intermediate shaft drivingly connected to an output member of said underdrive and disposed coaxial with said output shaft, an overdrive having an input member drivingly connected with said intermediate shaft and incorporating a third planetary gear unit to produce at least two different gear ratios, and an output gear drivingly connected by an axial spline fitting to an output member of said overdrive, said output gear being disposed between said underdrive and said overdrive and being disposed coaxially with said intermediate shaft;

a transmission shaft disposed substantially parallel with said intermediate shaft of said auxiliary speed change gear assembly;

a driven gear secured to one end of said transmission shaft for meshing engagement with said output gear;

a drive gear secured to the other end of said transmission shaft disposed for rotation in a plane generally axially between said torque converter and said auxiliary speed change gear assembly; and a final reduction gear disposed substantially centrally between said wheels in meshing engagement with said drive gear, said final reduction gear being disposed proximate said torque converter and transmitting power from said drive gear to said axles.

11. A driving device for an automobile as defined in claim 10, wherein said third planetary gear unit includes a sun gear, pinion gears rotatably supported on a carrier and a ring gear, a clutch for selectively connecting said carrier with said sun gear, and a brake for selectively connecting said sun gear with a fixed element, and wherein said input member is said carrier and said carrier is formed integrally with said intermediate shaft.

12. A driving device for an automobile as defined in claim 11, wherein the output member of said overdrive is constituted by the ring gear of the third planetary gear unit.

13. A driving device for an automobile as defined in either of claims 10 or 11, further comprising a drive case attached to the housing of said engine and substantially housing said fluid type torque converter, underdrive, transmission shaft and final reduction gear, and an auxiliary case mounted to the end of said drive case remote from said engine and encasing said overdrive.

14. A driving device for an automobile as defined in claim 13, further comprising a cylindrical case secured within said auxiliary case proximate the inner periphery thereof and disposed between the overdrive and underdrive.

15. A driving device for an automobile as defined in claim 14, wherein one end portion of said intermediate shaft is rotatably supported by said auxiliary case through a bearing.

16. A driving device for an automobile as defined in claim 13, wherein said brake has braking elements splined to the inner surface of said auxiliary case and on the outer periphery of the third planetary gear unit and has a servo mechanism provided within said cylindrical case.

17. A driving device for an automobile as defined in claim 16, wherein said cylindrical case is provided with an oil passage for supplying oil pressure to or discharging oil pressure from the servo mechanism of said brake.

18. A driving device for an automobile as defined in claim 14, wherein a bearing is provided between said intermediate shaft and said cylindrical case for rotatably supporting said intermediate shaft.

19. A driving device for an automobile as defined in claim 10, wherein a bearing is interposed between said intermediate shaft and said output gear.

20. A driving device for an automobile as defined in claim 11, further comprising a one-way clutch connected to a hub of said intermediate shaft and having a race member inserted into a bore formed in a hub of said output gear for engagement with a peripheral wall surface of the bore through a friction element.

21. A driving device for an automobile as defined in claim 20, wherein said race member of said one-way clutch is an inner race member and said peripheral surface is a circular surface.

22. A driving device for an automobile as defined in claim 16, wherein said servo mechanism of said brake comprises a piston and a return spring retained on said auxiliary case for pressing said piston in one direction.

23. A driving device for an automobile as defined in claim 10, further comprising a first one-way clutch engageable with the sun gears of said first and second planetary gear units and a second one-way clutch engageable with the carrier of said second planetary gear, said first and second one-way clutches being provided side-by-side as seen in a radial direction and in a lapped relation as seen in the axial direction.

24. A driving device for an automobile as defined in claim 23, wherein said first one-way clutch is provided radially inward of said second one-way clutch.

25. A driving device for an automobile as defined in claim 23, wherein said first one-way clutch has an outer race which is selectively fixed through a hub and a brake unit.

26. A driving device for an automobile as defined in claim 25, wherein said second one-way clutch has an outer race spline-fitted on a fixed structure, said outer race of said second one-way clutch mounting thereon a servo mechanism of said brake.

27. A driving device for an automobile as defined in claim 10, wherein the output member of said underdrive is constituted by the ring gear of said second planetary gear unit and a hub meshing with teeth of said ring gear and spline teeth of said intermediate shaft.

28. A driving device for an automobile as defined in claim 10, wherein the sun gears of said first and second planetary gear units are formed integrally with each other and connected to the output shaft of said fluid type torque converter through a first clutch, and the ring gear of said first planetary gear unit is connected to the output shaft of said torque converter, the carrier of said first planetary gear unit engaging with spline teeth on said intermediate shaft, the carrier of said second planetary gear unit being selectively connected to a fixed structure through a brake, and the ring gear of said second planetary gear unit engaging spline teeth on said intermediate shaft through a hub.

* * * * *